United States Patent
Stoner, Jr.

(10) Patent No.: US 6,288,846 B1
(45) Date of Patent: Sep. 11, 2001

(54) VARIABLE FOCAL-LENGTH LENS ASSEMBLY

(75) Inventor: John O. Stoner, Jr., Tucson, AZ (US)

(73) Assignee: Arizona Carbon Foil Co., Inc., Tucson, AZ (US)

( * ) Notice: Subject to any disclaimer, the term of this patent is extended or adjusted under 35 U.S.C. 154(b) by 0 days.

(21) Appl. No.: 09/404,956

(22) Filed: Sep. 24, 1999

(51) Int. Cl.⁷ .................. G02B 3/14; G02B 6/34; G02C 7/08
(52) U.S. Cl. .................. 359/666; 351/172; 385/37; 359/743
(58) Field of Search .................. 359/665, 666, 359/667, 554, 742, 743; 351/159, 172; 385/37

(56) References Cited

U.S. PATENT DOCUMENTS

| | | | |
|---|---|---|---|
| 2,437,642 | 3/1948 | Henroteau | 88/41 |
| 2,576,581 | 11/1951 | Edwards | 88/41 |
| 3,161,718 | 12/1964 | De Luca | 88/57 |
| 3,614,215 | 10/1971 | Mackta | 351/41 |
| 3,738,734 | 6/1973 | Tait et al. | 350/179 |
| 4,174,156 | 11/1979 | Glorieux | 351/168 |
| 4,181,408 | 1/1980 | Senders | 351/159 |
| 4,418,990 | 12/1983 | Gerber | 351/41 |
| 4,453,587 | 6/1984 | Gowan | 164/46 |
| 4,466,706 | 8/1984 | Lamothe, II | 350/419 |
| 4,753,414 | 6/1988 | McCandless | 249/115 |
| 4,865,438 | 9/1989 | Wada | 351/158 |
| 5,013,145 | 5/1991 | Croll | 351/52 |
| 5,113,270 | 5/1992 | Fergason | 359/37 |
| 5,138,494 | 8/1992 | Kurtin | 359/666 |
| 5,182,585 | 1/1993 | Stoner | 351/41 |
| 5,440,798 | 8/1995 | Weymouth, Jr. | 29/527.6 |
| 5,526,067 | 6/1996 | Cronin et al. | 351/41 |
| 5,597,613 | 1/1997 | Galarneau et al. | 427/162 |
| 5,624,611 | 4/1997 | Lippert | 264/1.36 |
| 5,712,721 | * | 1/1998 | Large | 359/245 |
| 5,739,959 | 4/1998 | Quaglia | 359/666 |
| 5,745,289 | 4/1998 | Hamblen | 359/565 |
| 5,956,183 | * | 9/1999 | Epstein et al. | 359/666 |

\* cited by examiner

Primary Examiner—Scott J. Sugarman
(74) Attorney, Agent, or Firm—Antonio R. Durando

(57) ABSTRACT

Switchable optical devices are made of transparent optical elements having surfaces separated by small distances, typically less than a few hundred micrometers. The transparent elements contain roughness, kinoforms, Fresnel-lens, or other relief structures with predetermined optical properties that affect the passage of light through the optical elements by refraction and/or diffraction. By introducing a liquid with a refractive index matching that of the transparent elements' material into the space between the surfaces, the effects of the surface structures disappear almost completely, thereby changing the optical characteristics of the device. This effect is used advantageously to change the focal properties, scattering properties, or light directing properties of different kinds of optical devices.

17 Claims, 7 Drawing Sheets

VARIABLE FOCAL-LENGTH LENS ASSEMBLY

BACKGROUND OF THE INVENTION

1. Field of the Invention

This invention is related to the general field of lenses with variable focal length. In particular, the invention consists of devices with variable optical properties changed by the introduction of very thin liquid layers between opposite optical surfaces.

2. Description of the Prior Art

Presbyopia, disease, genetic conditions and accidents often affect people's ability to focus over a wide range of viewing distances. Therefore, most people at some point in their lives need to wear glasses to correct their eyesight, often with different correction requirements for distant and near vision. To that end, people use bifocal or even trifocal lenses that provide specific correction over predetermined distances, but these lenses do not afford good correction for intermediate distances. Therefore, the ideal corrective lens should have adjustable refractive power to provide variable vision compensation for any distance.

Accordingly, for many years inventors have been trying to develop eyeglasses with controllable focusing power. Various inventions have involved the use of conventional mechanically-operated zoom lenses, which are relatively heavy, and liquid-crystal lenses, which suffer from turbidity and insufficient refractive-index change. Another approach has been to use various forms of liquid lenses, which typically have small apertures, poor optical focusing, and require large amounts of liquid to change their properties, causing them also to be heavy and cumbersome.

Several patents exist for eyeglasses with variable focal length obtained by moving solid lenses, as in zoom lenses. See, for example, U.S. Pat. No. 4,865,438. Because of the multiple lenses and mechanisms required for the variable focal length feature, these glasses are necessarily heavy and cumbersome. Thus, they are not yet found in standard eyewear.

A more common approach to achieve this goal has been through the use of liquid or deformable-gel lenses. See, for example, U.S. Pat. Nos. 2,437,642, 2,576,581, 3,161,718, 3,614,215, 3,738,734, 4,174,156, and 4,466,706. All of these patents disclose inventions designed to produce varied focal lengths by changing the content, shape or thickness of fluid-filled lenses, thus providing variable refractive characteristics in a single lens.

In particular, U.S. Pat. No. 4,181,408 discloses a vision compensation system that includes fluid lenses that are adaptively adjustable to correct for vision at different focal lengths. The refractive power of the lenses, mounted on a standard spectacle frame, is changed by varying their curvature as a function of the amount of liquid retained in them, which is in turn controlled by a hydraulic pump system that is operable either manually or automatically.

A similar device was disclosed in U.S. Pat. No. 5,182,585, involving eyeglasses equipped with liquid lenses having adjustable refractive power that depends on the amount of liquid forced into each lens. An electrically powered pump and an electronic controller regulate the liquid input to the lenses in response to a signal determined by the focal length required for viewing a given object in the field of vision, as determined by a rangefinder mounted on the frame of the eyeglasses.

Other patents involving liquid-filled lenses were issued to Croll (U.S. Pat. No. 5,013,145), describing novelty eyeglasses that use a space between lenses that can be filled with a colored liquid (but are not focusable thereby); Gerber (U.S. Pat. No. 4,418,990), disclosing glasses having variable focal length adjusted by pressure along the lens; Quaglia (U.S. Pat. No. 5,739,959), teaching the use of a clear magnetic fluid and solid optical components moved via electromagnets to automatically focus eyeglasses; and Cronin et al. (U.S. Pat. No. 5,526,067) and Kurtin et al. (U.S. Pat. No. 5,138,494), teaching the use of liquid surfaces to form lenses with variable focal length.

Obviously, the complex hardware involved in these inventions is sensitive to any change in physical properties, such as elasticity or temperature, that may cause misalignments of the various components with attendant optical defects, or require a new calibration. Moreover, major problems are related to the high mass and poor optical quality that result from having a relatively large volume of liquid contained between optical membranes.

Several patents teach the application of liquid-crystal layers for use in eyeglasses. Such layers, having optical properties that depend upon applied electric fields, can be used to change the transmissive or the focal properties of eyewear lenses according to the desires of the wearer (see, for example, U.S. Pat. No. 5,113,270).

Intraocular lenses have also been envisioned with focal properties varied by amount or type of injected fluid, or by voltages applied to liquid crystals, or by holographic fragments.

The principal difficulty in making eyeglasses having sufficient focal range with liquid crystals is the limited range of refractive index available due to change of electric fields, which requires thick layers of fluids, and the turbidity of such liquids, making the transmission of thick layers unsatisfactory for use in eyewear. Additionally, there are technical difficulties in producing the necessary precise distributions of high voltages to enable good focusing.

Lack of sufficient range of refractive index also limits the use of liquid crystals in thin layers which alternately match, or do not match, the refractive indices of the surfaces enclosing them, so that diffractive lenses present on those surfaces are optically present or absent according to voltages applied to the liquid crystals. The principal difficulty of this approach, to obtain sufficient index mismatch to enable a lens to focus a large fraction of the light passing through it, remains largely unsolved.

Therefore, this invention is directed at a novel approach to providing variable focusing power of an optical system, wherein the focal length is determined by the optical properties and variable combinations of various fixed solid components in a device, rather than the manipulation and deformation of liquid layers and flexible membranes.

BRIEF SUMMARY OF THE INVENTION

The primary objective of this invention is the rapid change of optical or light-handling properties of an optical system between multiple transmittance states.

Another specific objective of the invention is a system of corrective lenses having variable focal length depending on the introduction of liquid layers into the optical path of the system.

Another object is a system that involves the manipulation of only tiny amounts of liquid between solid optical surfaces, preferably either adhered to a surface or flowing between fixed surfaces (rather than between flexible membranes or between a fixed surface and a membrane, as taught in the prior art).

Still another goal of the invention is a system suitable for coupling with a rangefinder to determine the desired focal adjustment by sensing the presence of a primary object within a certain range of distances in the field of vision of a user and automatically adjusting the lenses to a corresponding predetermined setting that causes them to be in focus for a viewer in that particular range of distances.

A further goal of the invention is an apparatus that enables the utilization of solid lenses with well defined optical properties, such as kinoform lenses, to provide specific alternative optical corrections in combination with removable liquid layers.

Still another objective is the development of systems that can be implemented with pairs of one-dimensional kinoforms, thereby reducing the complexity and cost of manufacturing accurately formed lenses.

Another goal is a method of manufacture of kinoform lenses that is particularly suitable for manufacturing the one-dimensional kinoforms of the invention reliably and inexpensively.

According to these and other objectives, the present invention consists of devices made of transparent optical elements having surfaces separated by small distances, typically less than a few hundred micrometers. The transparent elements contain roughness, kinoforms, Fresnel-lenses, or other surface-relief structures with predetermined optical properties that affect the passage of light (or other electromagnetic radiation) through the optical elements by refraction and/or diffraction. By introducing a liquid with a refractive index matching or nearly matching that of the transparent elements' material into the space between the surfaces, the effects of the surface structures disappear almost completely, thereby changing the optical characteristics of the device. Thus, this effect can be used advantageously to change the focal properties, scattering properties, or light-directing properties of different kinds of optical devices.

According to one aspect of the invention, a system of corrective lenses for eyeglasses includes a surface on an optical component formed to contain a specific kinoform lens designed for diffracting light according to a predetermined pattern. A liquid layer of matching refractive index is coated onto an opposing smooth surface and used to change the properties of the kinoform by flooding the lens by contacting the opposing surfaces, thereby reducing the kinoform to a featureless surface of negligible roughness, thus greatly changing its optical properties. The changes can be reversed by removing the liquid layer by separation of the opposing surfaces. Thus, the liquid layer can be introduced or withdrawn at will to cause the reversible appearance or erasure of kinoforms that serve as optical lenses, thereby changing the optical properties of the device. The same optical results can be achieved by filling the space between the opposing surfaces with a non-wetting index-matching fluid, which can then be withdrawn to restore the effect of the lens.

According to another aspect of the invention, switchable optical devices are disclosed based on the utilization of combinations of one-dimensional (linear) kinoforms. As well understood in the art, "linear" or "cylindrical" lenses are focusing elements that focus only in one dimension. Linear kinoform lenses can be formed on either flat or curved optical surfaces, and the combination of two linear kinoforms with crossed axes is equivalent to a single conventional lens that focuses in two dimensions. The invention includes an easier, quicker, less expensive and more accurate method for manufacturing such kinoforms than previously known in the art.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DETAILED DESCRIPTION OF THE INVENTION

Figure 1A:
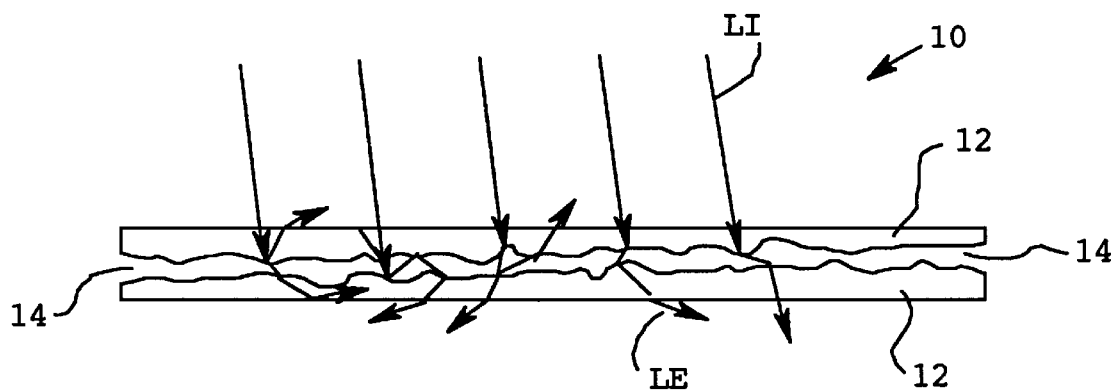
FIG. 1A is a schematic representation of a switchable window or mirror consisting of two opposite plates with interior surfaces containing at least one rough surface for scattering light passing through the assembly.

It is known that the light scattering effect of a rough optical surface on a transparent material is virtually eliminated by the application of a fluid film having a refractive index equal to that of the material so that the irregularities in the rough surface are filled to form a uniform layer with a smooth surface. The heart of this invention lies in the idea of utilizing this phenomenon to develop a class of new devices with optical properties that can be changed significantly (altered or switched on and off) by the alternative introduction and extraction of thin liquid layers between opposite optical surfaces.

For the purposes of this disclosure, a conventional (spherical) lens is defined as a lens that focuses in two directions, converting a point object into a point image (neglecting the effects of aberrations). Such a lens is typically formed as two spherical surfaces serving as the boundaries of a transparent body. A cylindrical lens is defined as a lens that focuses in one direction only, converting a point object into a line image. Such a lens is typically ground and polished as a transparent rod, or is otherwise formed to have constant cross-sectional shape along one direction, its axis, and to have a cross sectional shape with a boundary consisting of a circular arc and a straight line connecting the ends of the arc.

The term "kinoform," as used herein, is intended to mean a sawtooth surface profile on an optical component, with typical profile heights of the order of a wavelength of light and with heights and spacings designed to focus or direct light as desired. A properly-designed and constructed kinoform ideally has 100% diffraction efficiency for creating an image at one particular wavelength. Most kinoforms are either used as holograms, diffraction gratings or as lenses, often microlenses. Diffraction gratings are composed of ruled, etched, or built-up lines on a substrate that may be flat or curved, the lines usually being parallel to each other or approximately so. Kinoform lenses typically consist of circular-relief patterns etched into, replicated onto, or deposited onto flat substrates. Many techniques for making such optical devices are well known in the art (see, for example, U.S. Pat. No. 5,745,289).

A surface on an optical component can be formed to have either random roughness or specific surface shapes (Fresnel lenses, microlenses, gratings, staircase profiles, kinoforms and the like) for the purpose of scattering, imaging, diffracting or otherwise directing light. Applying the concept of the invention, a liquid layer coated onto such a surface can be used to change its properties, for example, from strongly scattering, focusing or diffracting to those of a featureless surface with negligibly small roughness. After application of the liquid layer, such a surface would no longer be significantly diffracting, focusing, or scattering, thus greatly changing its optical properties. Furthermore, these changes can be reversed by the removal of the liquid layer.

Therefore, it is anticipated that a variety of useful devices can be made advantageously by the reversible addition of liquid layers between pairs of optical surfaces to cause the erasure of kinoforms or other optical structures that serve as optical lenses, diffraction gratings, or other optical components, thereby changing their optical properties. All such devices must include at least a pair of optical surfaces separated by a typical distance of a fraction of a millimeter, with at least one of the opposing surfaces either being randomly rough or formed into a kinoform or other diffractive or refractive structure. In addition, each such pair of optical surfaces is connected to a source of liquid adapted to reversibly fill the space between the optical surfaces with an index-matching liquid.

Thus, an optical device so constructed has two modes of operation for each pair of closely-lying opposite surfaces between which liquid may be introduced and removed. For example, the device may have two different focal lengths, two different transmissivities, or two different sets of color-handling properties, for each such pair of surfaces. As such, N independently operable pairs (devices) in series produce a device capable of having $2^N$ independent sets of properties.

Figure 1B:
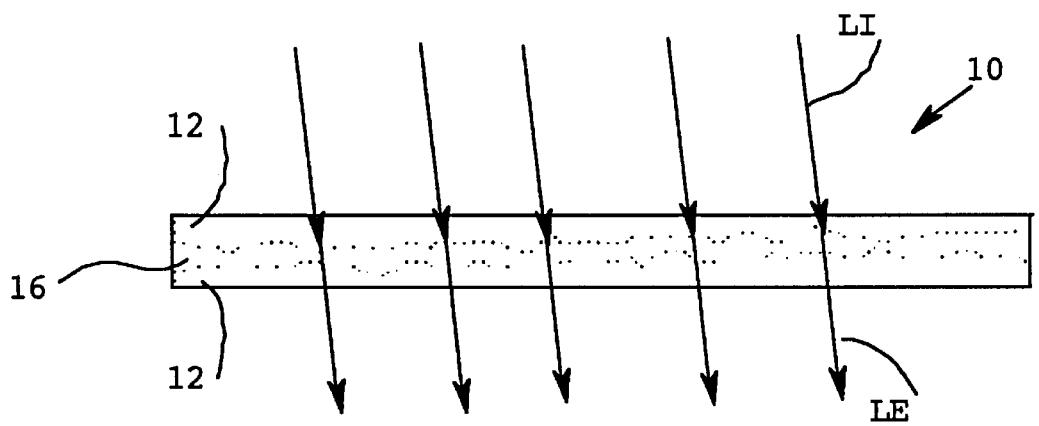
FIG. 1B is an illustration of the assembly of FIG. 1A where the gap between the opposite plates has been filled with a fluid having an index of refraction equal or nearly equal to that of the plate containing the rough surface, thereby substantially eliminating all random refraction.

The principle of the invention is illustrated in the switchable window or mirror 10 of FIG. 1A. Two plates 12 of the same material are randomly or systematically roughened, with roughness comparable to the wavelength of visible light, and placed with the rough faces opposite to each other. As a result of the scattering produced by the rough surfaces, incident light rays LI cannot be transmitted undeviated through the assembly, as illustrated by the rays LE emerging therefrom. Thus, an image cannot be transmitted by such an assembly. However, as illustrated in FIG. 1B, if a liquid 16 with a refractive index substantially equal to that of the plates 12 (or that of the roughened layer, if different) is introduced into the gap between them, the roughness is smoothed and disappears optically, so that an image can readily be seen through the assembly. Therefore, such a device can serve as a switchable window or, if either surface on one component is made reflective, as a switchable mirror. As well understood by those skilled in the art, similar effects can be obtained with a plate whereon only one surface has been roughened, so long as the liquid matches that plate's refractive index.

In as much as the invention is expected to produce great advantages and find economical applications in the field of eyesight correction, it is detailed below principally with reference to lenses for prescription eyeglasses. The production of a sharp image on the retina of the eye, which corresponds to a view that is in focus to the observer, requires that the successive refraction of rays of light from a point on the object being observed through the various surfaces in the path of travel of the light result in their convergence to a single point on the retina. People with normal eyesight can naturally adjust the refractive power of their eyes to cause such convergence in most instances. On the other hand, the refractive effect of each lens in prescription eyeglasses is designed to compensate for the refraction capability that is missing in the eyes of people with abnormal eyesight, either because of age or other vision defect.

Figure 2A:
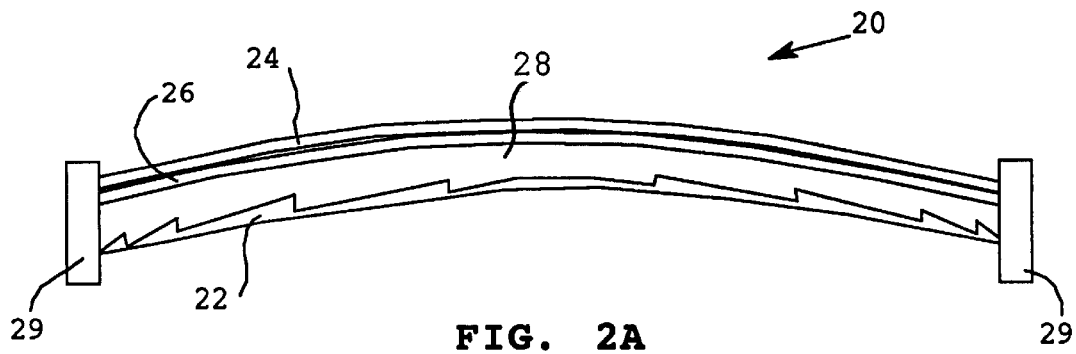
FIG. 2A is a schematic representation of a switchable kinoform or Fresnel lens consisting of two opposite plates with interior surfaces containing a refracting and/or diffracting structure and an index-matching liquid film separated by a gap, thereby providing a structure functioning as a lens for light passing through the assembly.
Figure 2B:
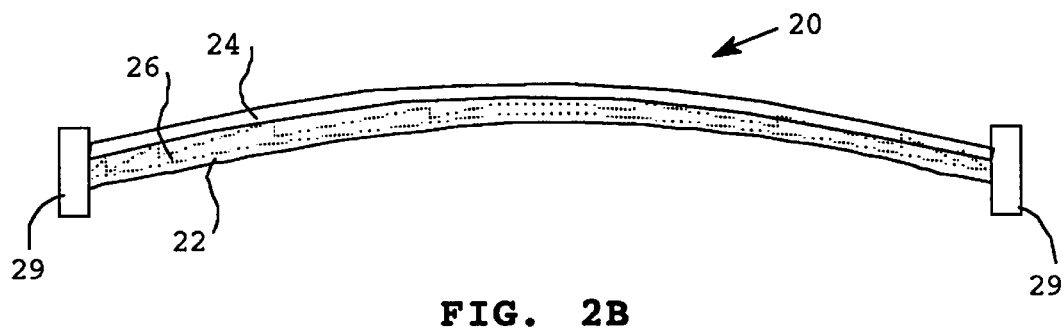
FIG. 2B is an illustration of the assembly of FIG. 2A where the two opposite plates have been pressed together to cause the liquid film to fill the gap between plates, thereby substantially eliminating the lens effect provided by the refracting surface.

According to the present invention, a new type of vision-compensation lens to provide the needed supplementary refractive power consists, in its simplest embodiment, of a liquid-switched optical element. Referring to the drawings, wherein like parts are identified throughout with like symbols and numerals, FIG. 2A is a schematic view of an eyeglass lens assembly 20 embodying the variable focal length system of the invention. The assembly comprises a switchable kinoform or Fresnel lens 22 disposed substantially parallel to a transparent plate 24 having substantially the same radii of curvature. A fluid 26 with a refractive index matching that of the material of the lens 22 is deposited on the plate 24 with a thickness greater than the depth of the kinoform's structure, and a gap 28 is left between the two opposing surfaces. As such, the assembly 20 functions as a lens having the optical properties of the kinoform or Fresnel lens 22. According to the invention, the lens assembly 20 can be switched to a second mode of operation wherein the refractive effects of the lens 22 are virtually eliminated. As illustrated in FIG. 2B, switching is accomplished by mechanical contact of the lens 22 with the index-matched fluid 26 adhered to the plate 24, so that the fluid fills up the surface pattern of the kinoform structure and optically cancels the operation of the lens. To reverse the effect and return to the refractive mode, the fluid-carrying plate 24 is removed mechanically away from the lens 22, in which case the optical characteristics of the lens are restored as the fluid 26, adhering preferentially to the plate 24, self-flattens under surface-tension forces. A mechanism 29, illustrated schematically in the figures, must obviously be provided to cause the contacting and separation of the lens 22 and plate 24, as needed for the operation of the invention. Because of the small motions required, it is anticipated that piezoelectric actuators may be used to move the lens and provide an electromechanical control of the focal length of the assembly. Thus, it is clear that this kind of optical device is functionally equivalent to a bifocal lens with the added advantage that the correction extends to the entire field of vision of the lens.

It is understood that the liquid 26 must be capable of adhering to the plate 24 but not to the lens 22, preferably through the action of surface-tension forces. Thus, for example, if the liquid 26 consists of a water solution, the lens 22 and the plate 24 need to be hydrophobic and hydrophilic materials, respectively. The liquid 26 may also be a soft plastic, such as a silicone-based material, so long as it is capable of regaining a smooth surface rapidly when no longer pressed against the kinoform.

Figure 3A:
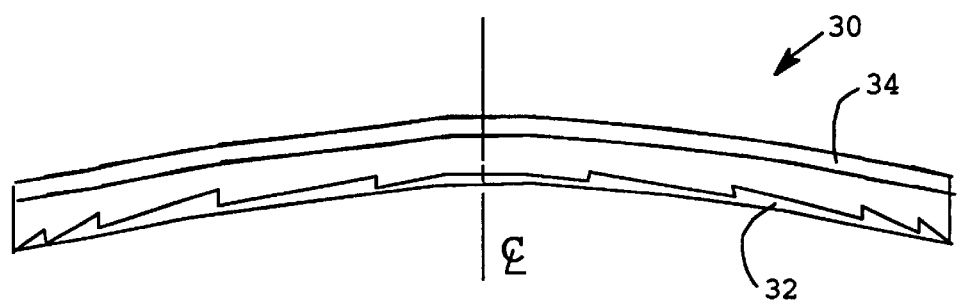
FIG. 3A is a schematic representation of a switchable kinoform or Fresnel lens consisting of two opposite plates with interior surfaces containing at least one kinoform structure for refracting light passing through the assembly.
Figure 3B:
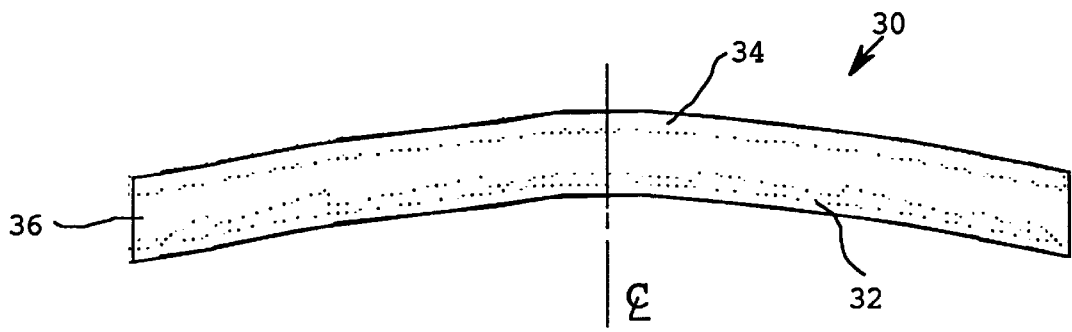
FIG. 3B is an illustration of the assembly of FIG. 3A where the gap between the opposite plates has been filled with a fluid having an index of refraction equal to that of the plate containing the kinoform lens, thereby substantially eliminating its effect.

Another embodiment 30 of the invention shown in FIGS. 3A and 3B consists of a kinoform or Fresnel lens 32 switchable by the introduction or withdrawal of a fluid. A conforming protective transparent sheet 34 is located a small distance away from the lens 32, which includes a pattern formed in its surface to affect the light transmitted and/or reflected by the assembly. The sheet and the lens may be curved, as shown, or planar. An index-matching liquid 36 introduced into the space between the lens 32 and the sheet 34 fills in the lens pattern and causes the removal of its optical effects. It is noted that a similar effect could be obtained with a transmission grating, rather than a kinoform or Fresnel lens.

Thus, when no liquid is present to flood the kinoform, as seen in FIG. 3A, the assembly 30 acts as a lens (or grating, if so designed). When the liquid 36 is introduced between the interior surfaces of the lens 32 and the sheet 34 and optically matches the lens surface, the refractive effect of the patterning on the lens is removed. Therefore, the assembly acts as a transparent plate, except possibly for residual focusing effects due to the curvature of the plates, if any.

Figure 4A:
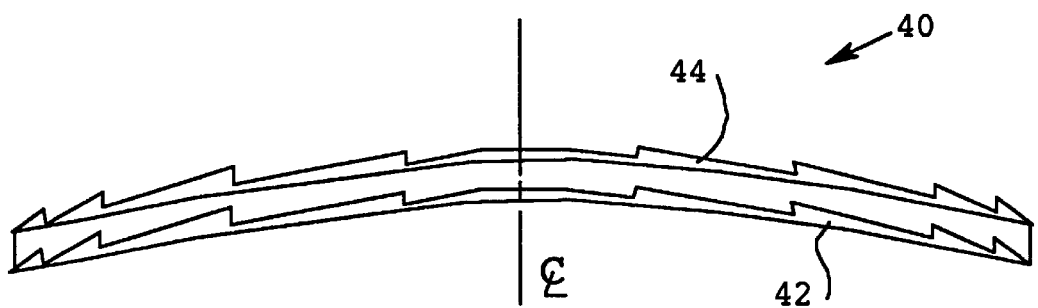
FIG. 4A is a schematic representation of two opposite plates combining a switchable inner kinoform or Fresnel lens, contained on a surface within the gap between the two plates, with a non-switchable outer kinoform or Fresnel lens formed on a surface exterior to the gap.
Figure 4B:
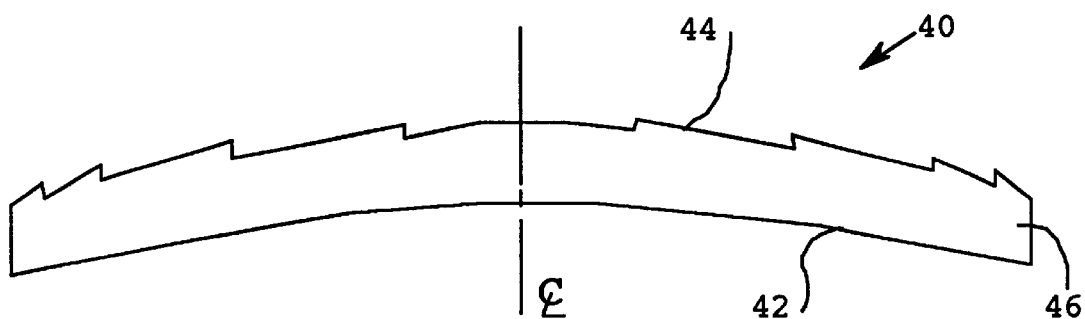
FIG. 4B is an illustration of the assembly of FIG. 4A where the gap between the opposite plates has been filled with a fluid having an index of refraction equal to that of the interior surface of the plate containing the kinoform lens, thereby substantially eliminating its effect.

In yet another embodiment 40 of the invention shown in FIGS. 4A and 4B, two substantially parallel kinoform or Fresnel lenses are combined. A first lens 42 includes a refractive surface facing the gap between the two lenses, while the second lens 44 has the kinoform structure on its outer surface (FIG. 4A). As in the other embodiments, switching is accomplished by injecting an index-matched fluid 46 to fill up the irregularities in the surface patterning of the interior lens 42, thereby optically cancelling the operation of the lens, as illustrated in FIG. 4B. The refractive effect of the second lens 44 remains unaltered. Thus, the index-matching fluid 46 injected between the components reduces the optical power by filling up the interior kinoform's structure so that the interior region becomes equivalent to just a parallel plate. As a result, the interior kinoform no longer contributes to the focusing power of the assembly.

It is noted that the amount of fluid required for switching is small. For example, if the components are disposed 20 $\mu$m apart and have a surface area of about 100 $cm^2$ (considered very large for eyeglasses), the total volume of fluid needed is only 0.2 cc. If the fluid does not wet the components, it is easily removable through suction with a slight vacuum. If necessary, the space between the components may also be slightly wedged to facilitate removal of the fluid. Obviously, channels for ingress and egress of fluid through the frame used for mounting the lens components must be provided, but such structures are well known in the art relating to liquid lens devices. Similarly, devices for moving small amounts of fluid are known. Therefore, such details are not described here.

Figure 5:
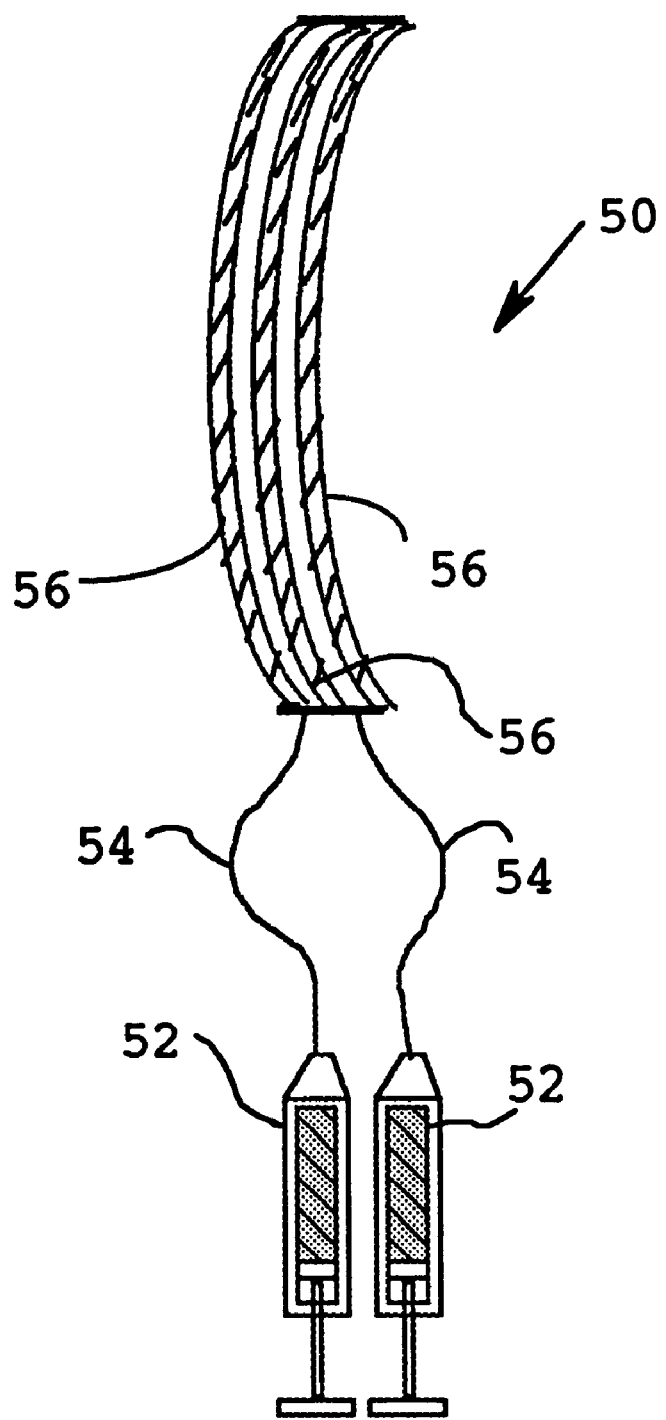
FIG. 5 is a schematic illustration of a system with two lenses in series and two fluid pumps, in the form of syringes, for squirting index-matching fluid through connecting tubing into the gaps between pairs of kinoforms, each pair comprising one lens.

FIG. 5 illustrates schematically a two-lens assembly 50 with two fluid pumps 52, in the form of syringes, for squirting index-matching fluid through connecting tubing 54 into the gaps between pairs of surfaces 56 and removing it therefrom by suction, thereby turning off and on, respectively, the focal action of each pair of surfaces. It is anticipated that several different fluid-handling systems could be used to implement the invention. For example, manually or motorized hypodermic syringes, peristaltic pumps, compressible bulbs, and piezoelectric, hydraulic or pneumatic actuators could all be used advantageously to inject and withdraw the index-matching fluid.

The use of one-dimensional (linear) lenses is considered particularly suitable for eyeglasses and other optical devices constructed according to the invention. Each switchable lens consists of two opposite surfaces, which may be two linear kinoforms with their axes perpendicular to one another. Because the combination of two linear kinoforms with perpendicular axes corresponds to a single conventional lens that focuses in two dimensions, all forms of eyesight correction can be achieved with linear lenses, which are simpler and less expensive to manufacture than conventional two-dimensional kinoforms. Thus, another aspect of the present invention teaches an improved method and apparatus for manufacturing one-dimensional kinoform lenses.

Figure 6:
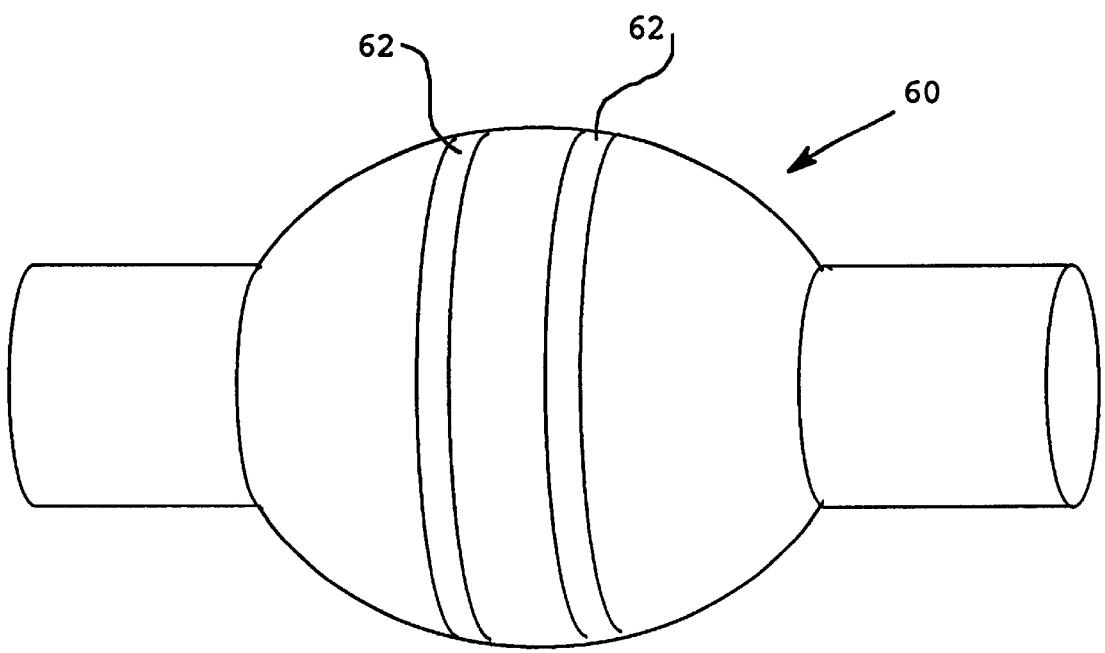
FIG. 6 is a schematic illustration of a mandrel with a negative cylindrical kinoform pattern on its exterior bicurved structure produced using a diamond-turning lathe.

As illustrated in FIG. 6, a mandrel 60 is made with a negative cylindrical kinoform pattern formed on a spherical or bicurved structure using a diamond-turning lathe, or by other means known in the art. The circumferential lines 62 shown for illustration on the spherical part of the mandrel correspond to the first two structural steps on each side of the centerline of the cylindrical kinoform lens to be produced thereby. It is noted that the central part of the mandrel could be made in equivalent fashion in the form of a prolate or oblate spheroid to correspondingly produce lenses of different radii in perpendicular directions, as in some conventional eyeglasses. Moreover, if the curvature of the two cylindrical kinoforms used to duplicate the function of a conventional lens is not the same, two separate mandrels, for vertical and horizontal lines, need to be used.

Using a mandrel as described, the process of producing a lens involves the following steps, which are generally known but have never been used or suggested for making linear kinoforms. First, a mold is made to fit the exterior surface of the mandrel, with an airspace of suitable thickness left between the mandrel and the mold. The mold need only be as large as an eyeglass lens blank. Next, the airspace is filled with a casting resin or other transparent casting compound. When the resin is almost completely hardened, the mold is removed and the casting is cured as needed (i.e., baked, UV treated, aged, etc.). Finally, one or more lenses are cut out of the cured casting. Such lenses are often referred to as daughter lenses; that is, they are the product of first-generation casting. The resulting kinoform lens formed on a negative-pattern mandrel is a positive lens formed on a concave surface.

For positive lenses on a convex surface, an intermediate step is required. First, a mandrel is made with a positive cylindrical kinoform lens structure on its exterior surface. Then, the first-generation casting, which will have a negative kinoform lens on its outside concave surface, is used as the mold for a second-generation casting, which will have the desired shape.

A lens could also be molded simply by lowering the mandrel into a disk-shaped container filled with an appropriate monomer, such as CR-39®, sold by PPG Industries of Pittsburgh, Pa., or poly methylmethacrylate (PMMA), and causing the monomer to polymerize. If the radii of curvature of the bottom of the monomer's container match the curvatures of the mandrel, the resulting lens can be nearly net shape, and quite thin (1–2 mm, preferably thin for lightness and thick for strength). Thus, this method of lens manufacture is also suitable for direct use of commercially made blanks according to the following procedure. Net-shape cast blanks of CR-39 (or other plastic) are coated with a thin layer of transparent adhesive capable of adhering to the blank but not to the mandrel; then the adhesive is brought into contact with the mandrel, caused to harden (perhaps UV activated), and removed from the mandrel. Thus, the technique is simply one of replication, a well understood and reliable way for making good and inexpensive optics, using the mandrel of the invention. It is noted that the surface-relief structure on the mandrel is preferably made using a diamond lathe, but alternatively it can constructed by mask-based photolithography or by evaporation and deposition of dielectric or metallic layers on the mandrel. However, diamond-turning is believed to yield the best and least-expensive master mold.

Coining and other pressing-based methods, including injection-molding, could also be carried out using the mandrel of the invention by pressing it onto discs of appropriate material (such as PMMA). If necessary, heating could be provided from inside the mandrel. Alternatively, long strips of preheated PMMA could be passed under the mandrel as it rotated, thereby making long strips of cylindrical Fresnel lens that could then be stamped, sawn or laser-cut into eyeglass-shaped lenses. However, replication is expected to remain preferred because of its proven record in diffraction-grating production.

As explained, it is expected that the lenses produced with the mandrel of the invention can be made of nearly net shape. Similarly, they can be formed with compound curvature, with concave (or convex) surfaces having different curvatures in two directions, just as in conventional eyeglasses. Optical systems having more than one lens are expected to require both concave and convex sides on some components. On the other hand, because of their relative fragility, it would be preferable to have no Fresnel or kinoform structures on exposed surfaces. Therefore, assuming, for example, that horizontal and vertical kinoforms are to be placed on the convex and concave sides of a lens, respectively, three different kinds of moldings would be required. The first type includes, for instance, a horizontal kinoform on the convex side, the other side being smooth; the second type includes a vertical kinoform on the concave side, the other side being smooth; and the third type includes kinoforms on both sides, a horizontal kinoform on the convex side and a vertical kinoform on the concave side.

Figure 7A:
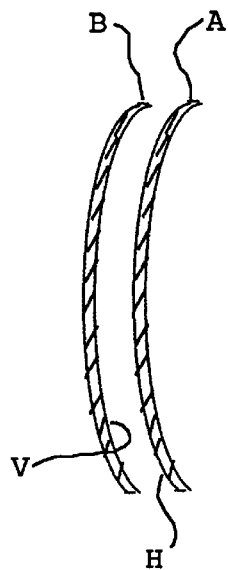
FIGS. 7A, 7B and 7C illustrate different lens-configuration designs having two or more different optical powers, depending on where index-matching liquid is injected between optical components.
Figure 7B:
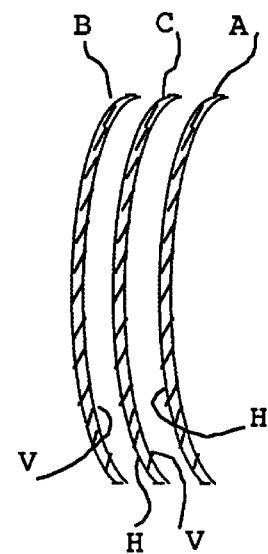
Figure 7C:
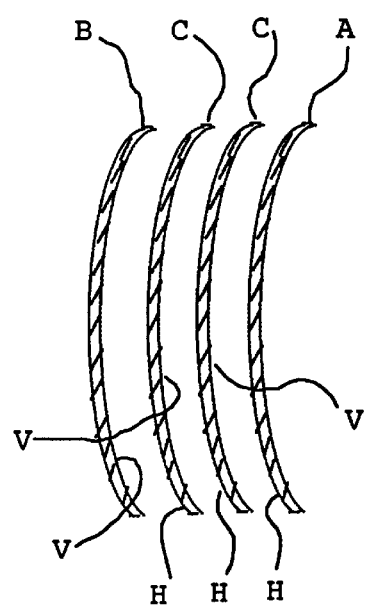

In order to manufacture eyeglasses, cylindrical lenses made by the process of the invention would preferably be assembled into solid fixed assemblies to avoid the use of flexible hinges or other moving components. FIGS. 7A, 7B and 7C illustrate different lens-configuration designs having two or more different optical powers, depending on where index-matching liquid is injected between optical components. Each interior surface consists of a linear (cylindrical) kinoform component. The symbol V indicates a vertical axis; H indicates a horizontal axis. Using a focal length of 1.25 meters for each kinoform, for example, each surface will have an optical power of 0.8 diopters (neglecting any refraction due to curvature). Thus, referring to the figures, the following different kinds of components are shown. Component A has a horizontal kinoform on its convex surface; component B has a vertical kinoform on its concave surface; and component C has a horizontal kinoform on its convex surface and a vertical kinoform on its concave surface. All three kinds of components can be made with a single mandrel, used as detailed above to make, for example, 0.8-diopter cylindrical Fresnel lenses. Thus, as one skilled in the art would readily understand, the power of a composite lens made of N molded complete lenses with focal length of 1.25 meters can vary from zero to $(N-1)(0.8D)$ diopters in 0.8-diopter steps, leaving smooth external surfaces for protection.

The refractive indices of the materials of the invention are wavelength-dependent and temperature-dependent. Therefore, the best choice of refractive indices for a particular application requires a judicious balance between optical performance and practical considerations such as other physical properties, safety, toxicity and cost. Tests have shown that within the temperature and wavelength ranges of interest for the invention a satisfactory approximate refractive-index matching can be achieved both with oil-based and water-based liquids. For example, using PMMA (refractive index of 1.49) for the lens material, oil-based geraniol (index of 1.46) and citral (1.48), and water-based potassium acetate, potassium citrate, magnesium chloride, and magnesium nitrate, either alone or in combination, would be suitable index-matching liquids to practice the invention. It is noted that the refractive index of water solutions is a function of solute's molecular weight and concentration. Therefore, these parameters can be manipulated to produce the desired value.

To the extent that a perfect match of the refractive index may be difficult to obtain, applying a simple anti-reflection coating to the internal (fluid-contacting) faces would largely solve the problem for devices used in transmission, such as eyeglasses and windows. The coating can be simply a single layer having optical thickness of (¼)-wavelength for visible light (that is, about 100 nanometers in physical thickness). In that case the layer needs to have a refractive index that is about the geometric mean of that of the fluid and that of the plastic. Silicon dioxide (on polycarbonate plastic lenses or windows) is a good anti-reflection coating for this application because it is insoluble, relatively inert, safe and easy to apply, and provides an almost perfect index match with many different water solutions having modest concentrations. The coating can further include a (much thinner) chemical treatment layer to make it hydrophobic, or oleophobic, or as needed.

A single layer anti-reflection coating suffers from the defect that it works perfectly only at one wavelength, on one substrate, with one fluid at one temperature; however, if the combination of fluid and layer is optimized at the peak of the eye's response, at room temperature, the layer will still be helpful for the whole visible range, over a wide range of temperature, and with the liquid either present or absent. As well understood in the art, multilayers could be designed easily to have better performance.

Thus, it has been shown that the present invention includes eyeglasses whose optical power depends upon liquid-switched lenses, such as kinoforms, the focal length of which can be changed at will by a wearer. It is anticipated that the optical power of such eyeglasses may be automatically controlled by an auxiliary rangefinder. The invention also encompasses liquid-switched diffractive optical systems other than lenses and arrays of lenses: for example, microlenses used in switchable fiber-optic fan-out assemblies, diffraction gratings used for analyzing spectra, gratings for wavelength-dispersed multiplexing of optical signals in fiber-optic systems, and gratings on the surfaces of optical fibers for manipulation of specific wavelengths within the fibers. The invention in each case utilizes the manipulation of very thin layers of liquid for changing optical powers of eyeglasses and other lens systems, deflecting paths of light beams, changing the chromatic properties of light-handling systems so that different wavelengths can be steered into different directions, or blocking light from certain paths.

This invention is believed to have particular significance at the present time because of the growing market of aging baby-boomers. It allows for a significant improvement to eyeglasses: a lightweight assembly that has the capability to focus as desired by a user. It therefore has widespread application and fulfills widespread long-felt needs. It also has application to laboratory optics requiring variable focus, and to switchable windows.

It is noted that another way by which a switchable window could be made involves the use of a thin, transparent sheet between two closely-spaced transparent panes. The thin transparent sheet should be embossed, frosted, or otherwise formed to have an irregular thickness and/or irregular surface(s) to make the sheet translucent and to provide channels for liquid ingress and egress. When an index-matched liquid is introduced between the window panes and immerses the thin transparent sheet, the fluid cancels out the irregularities and the assembly becomes transparent. This arrangement has the advantage that the structuring of the thin sheet can be done independently of the manufacturing processes used to provide the window with good structural integrity.

Figure 8:
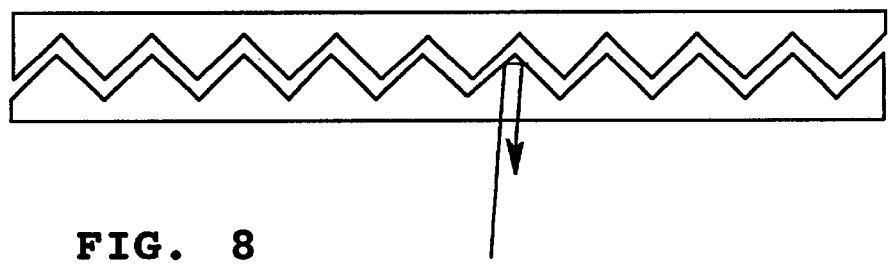
FIG. 8 illustrates a switchable optical window that reflects most light incident upon it from either side when no liquid is present and transmits most light from either side when the space between the panes is filled with an index-matching liquid.

A switchable window can also be obtained between fully-transparent and nearly fully reflecting elements, without using any reflecting coatings, if the interior surfaces of the elements are formed into long narrow prisms or into pyramids, each with an approximately 90-degree apex, as illustrated in FIG. 8. The prisms need not be interlocking. Without an index-matching fluid, light incident over a range of incident angles is totally internally reflected, from either side. With fluid present, the light passes through without deviation.

Various other changes in the details, steps and materials that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is therefore not to be limited to the details disclosed herein but is to be accorded the full scope of the claims so as to embrace any and all equivalent apparatus and methods.

I claim:

1. A switchable optical device comprising, in combination:
    (a) a first optical component having a first surface including a relief structure with predetermined optical properties that affect passage of electromagnetic radiation;
    (b) a second optical component having a second surface opposite to said first surface and separated by a gap; and
    (c) means for reversibly applying a film of fluid over said relief structure in the gap between the opposite surfaces;
    wherein the fluid and the relief structure have a substantially equal index of refraction, such that said optical properties are reversibly modified by the fluid when the fluid is applied over the relief structure.

2. The optical device described in claim 1, wherein said relief structure is a kinoform.

3. The optical device described in claim 1, wherein said relief structure is a linear kinoform.

4. The optical device described in claim 1, wherein said first and second surfaces are substantially parallel to one another.

5. The optical device described in claim 1, wherein said first and second surfaces are substantially parallel to one another, and each surface includes a linear kinoform in perpendicular alignment.

6. The optical device described in claim 5, wherein said first and second optical components are curved.

7. The optical device described in claim 1, wherein at least one of said first and second optical components is curved.

8. The optical device described in claim 1, wherein said relief structure is a diffraction grating.

9. The optical device described in claim 1, wherein said relief structure is a grating for wavelength-dispersed multiplexing of optical signals in a fiber-optic system.

10. The optical device described in claim 1, wherein said relief structure is a grating on an optical fiber for manipulation of specific wavelengths within the fiber.

11. The optical device described in claim 1, wherein said relief structure is random roughness to establish scattering in an optical window.

12. The optical device described in claim 1, wherein said film of fluid is permanently attached to the second surface and said means for reversibly applying the film of fluid over the relief structure comprises a mechanism for pressing the two surfaces together, thereby causing the fluid to cover the relief structure.

13. The optical device described in claim 12, wherein said mechanism includes a piezoelectric actuator.

14. The optical device described in claim 1, wherein said means for reversibly applying the film of fluid over the relief structure comprises a mechanism for reversibly flowing the fluid from a reservoir into the gap between the two surfaces, thereby causing the fluid to cover the relief structure.

15. The optical device described in claim 1, further comprising additional pairs of opposite surfaces optically aligned with said first and second surfaces, each pair including at least one additional relief structure with predetermined optical properties that affect passage of electromagnetic radiation; and comprising, for each additional pair of opposite surface, an additional means for reversibly applying a film of additional fluid over said additional relief structure in a gap between said additional pair of opposite surfaces; wherein the additional fluid and the additional relief structure of each additional pair of opposite surfaces have a substantially equal index of refraction.

16. A method for altering the passage of electromagnetic radiation in an optical device, comprising the following steps:

(a) providing a first optical component having a first surface including a relief structure with predetermined optical properties that affect passage of electromagnetic radiation;

(b) providing a second optical component having a second surface opposite to said first surface and separated by a gap; and (c) reversibly applying a film of fluid over said relief structure in the gap between the opposite surfaces, the fluid and the relief structure having a substantially equal index of refraction;

whereby substantially cancelling said predetermined optical properties of the relief structure.

17. The method described in claim 16, wherein said relief structure is a kinoform.

* * * * *